United States Patent [19]
Kato et al.

[11] 4,048,687
[45] Sept. 20, 1977

[54] AUTOMATIC ASSEMBLY APPARATUS FOR BOLTS AND NUTS

[75] Inventors: Kanji Kato, Kokubunji; Tatsuo Goto, Tokyo; Tadao Inoyama, Yokohama, all of Japan

[73] Assignee: Hitachi, Ltd., Japan

[21] Appl. No.: 636,840

[22] Filed: Dec. 2, 1975

[30] Foreign Application Priority Data

Dec. 4, 1974 Japan .................................. 49-138394

[51] Int. Cl.² ...................... B23P 19/08; B23Q 17/18
[52] U.S. Cl. .................................. 10/155 R; 29/240; 29/407; 29/705; 29/714; 29/720
[58] Field of Search ................. 10/155 R; 29/200 P, 29/208 C, 240, 407, 705, 714, 720; 81/3 R, 10, 52.5

[56] References Cited

U.S. PATENT DOCUMENTS

| | | | |
|---|---|---|---|
| 2,763,173 | 9/1956 | Bailey et al. ................. | 10/155 R |
| 2,943,335 | 7/1960 | Daniel et al. ................. | 10/155 R |
| 3,581,375 | 6/1971 | Rottmann ..................... | 29/407 |
| 3,824,674 | 7/1974 | Inoyama et al. .............. | 29/407 |
| 3,885,295 | 5/1975 | Engelberger et al. ......... | 29/208 C |

FOREIGN PATENT DOCUMENTS

| | | | |
|---|---|---|---|
| 248,476 | 7/1969 | U.S.S.R. ..................... | 29/200 P |

*Primary Examiner*—E. M. Combs
*Attorney, Agent, or Firm*—Craig & Antonelli

[57] ABSTRACT

Automatic assembling method to screw a nut on a bolt comprises steps of detecting a position of a bolt which is maintained by a supporter, and of positioning in rough a nut thereto by a positioning mechanism, in which the nut is supported by an attachment coupled with a motor through an elastic mechanism, which is capable of deformation in both directions of an axis and a radius. The nut, then is movably pressed against the bolt and rotated by the motor. When the nut is not screwed on the bolt, the positioning mechanism changes its position in two dimensions so that the nut is maintained movably pressed against the bolt and the nut is rotated again. The changing position of the positioning mechanism will be continued until the nut is screwed on the bolt.

28 Claims, 27 Drawing Figures

AUTOMATIC ASSEMBLY APPARATUS FOR BOLTS AND NUTS

BACKGROUND OF THE INVENTION

This invention relates to an automatic assembling method for a bolt and a nut and an apparatus thereof, and more particulary, to a method for screwing the nut on the bolt automatically and vise versa, and fastening automatically to each other.

It is well known that there are fastening machines which fasten a nut having been screwed on the bolt by two or three pitches, to the bolt. It is, however, very difficult to initially make the nut screw on two or three pitches of the bolt so that there are no techniques to completely automatically assemble the nut and the bolt.

There are many cases where the nut is not screwed on the bolt, wherein a relative angle between the nut and the bolt, which are pressed to each other, is larger than a certain angle where the nut is screwed on the bolt, and a contacting position therebetween is displaced from the position where the nut should be screwed on the bolt. Accordingly, some cases suffer from the problem wherein the nut slips at the top of the bolt without being screwed and the nut is irregularly locked to the bolt and cannot be fastened thereto.

Automatic assembling mechanism are required in many assembling processes of manufactured products, the same steps of which are needed to fasten nuts to bolts.

SUMMARY OF THE INVENTION

An object of this invention is to provide an automatic assembling method for bolts and nuts using simple control method.

Another object of this invention is to provide an automatic assembling apparatus in which a positioning mechanism operates to position the bolts and the nuts, the axes of which are not co-axial.

Further an object of this invention is to provide an automatic assembling apparatus in which control signals thereof are detected by non-contact detectors.

Still further an object of this invention is to provide an automatic assembling apparatus which can screw the nuts on the bolts even if the positions of the bolts and the relative relationship between the bolts and the nuts are not always constant at each assembling process thereof.

In order to achieve the above objects, an automatic assembling method for bolts and nuts of this invention includes steps of detecting the position of the bolt by a sensor having two detecting fingers which are arranged in two dimensions and of roughly positioning the nut to the bolt by a positioning mechanism which is controlled by the position signal of the bolt. The positioning mechanism provides driving mechanisms in three dimensions in addition to an elastic mechanism which can be movable in directions of an axis and a radius thereof. The nut is held by a holder coupled with a screw motor to rotate the nut through the elastic mechanism. A next step is to press the nut against the bolt and then the nut is rotated by the screw motor. If the nut is suitably positioned to the bolt, then the nut will be screwed on the bolt and fastened thereto, If the nut, however, slips at the top of the bolt or is irregularly locked to the bolt, the position of the positioning mechanism is changed two dimensions wherein the nut is maintained to be movably pressed against the bolt, and then the nut is rotated by the screw motor again. These steps are repeated until the nut will be screwed on the bolt and and fastened thereto. This automatic assembling method for the bolts and the nuts is utilized in many assembling processes of manufactured products and is useful in automation systems. These and other objects of this invention will be understood in more detail in connection with the following drawings.

BRIEF DESCRIPTION OF THE DRAWINGS

FIG. 12 (a–h) shows searching patterns used for control of a nut attaching mechanism.

DESCRIPTION OF THE PREFERRED EMBODIMENTS

Figure 1:
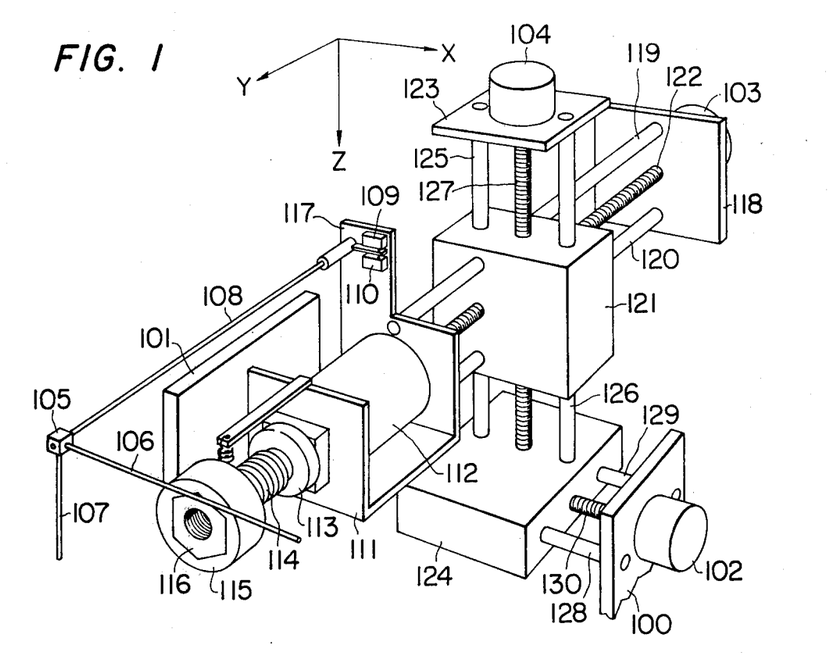
FIG. 1 is a perspective view of an automatic assembling apparatus for bolts and nuts of this invention.
Figure 2:
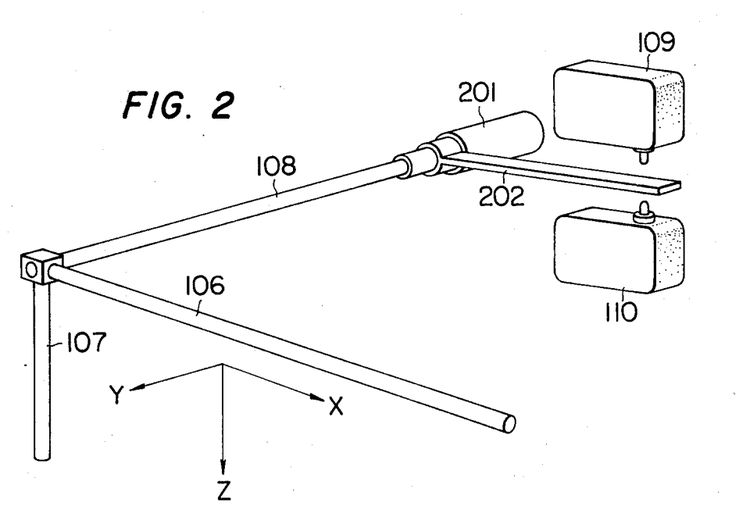
FIG. 2 is an enlarged view of a bolt position detector shown in FIG. 1.

Referring now to FIG. 1 showing an automatic assembling apparatus of this invention, in which blocks 100 and 101 are fixed on a base and a positioning mechanism is movably supported by the blocks 100 and 101, which can be moved in three directions of X, Y and Z as shown in arrow marks of three dimensions, by motors 102, 103 and 104 such as pulse motors and DC servomotor, respectively. The positioning mechanism comprises a detector 105 for detecting in rough a position of a center axis of a bolt (hereinafter named a bolt position detector) and a nut attaching mechanism 111. The bolt position detector 105 comprises detecting fingers 106 and 107, a movable shaft 108, and detecting elements 109 and 110 which detect displacements of the detecting fingers 106 and 107, the construction of which is shown in FIG. 2 in more detail. The nut attaching mechanism 111 comprises a motor 112 such as a pulse motor and a DC servomotor for making the nut rotate, a first elastic mechanism 113 coupled with the rotary shaft of the motor 112, a second elastic mechanism 114 such as a coil spring bellows coupled with the rotary shaft through the first elastic mechanism 113, the second elastic mechanism 114 being capable of inclination with respect to the rotating axis of the rotary shaft and can expand in an axial direction thereof, a nut holder 115 connected to the second elastic mechanism 114, in which the nut 116 is held, and a housing 117 holding the motor 112. The bolt position detector 105 is fixed on the housing 117 so that the nut attaching mechanism 111 and the bolt position detector 105 move commonly. The housing 117 of the nut attaching mechanism 111 is connected with a holding plate 118 on which the motor 103 is fixed, by guide shafts 119 and 120 through a first sliding block 121, in addition a ball screw 122 is coupled with the nut attaching mechanism 111 and the motor 103 through the first sliding block 121. Accordingly, the nut attaching mechanism 111 can be moved to Y direction due to the rotation of the motor 103. A holding plate 123 on which the motor 104 is placed, is coupled with a second sliding block 124 through the first sliding block 121 by guide shafts 125 and 126 as well as a ball screw 127 which guides the first sliding block 121, so that the nut attaching mechanism 111 can be moved to Z direction according to the rotation of the motor 104. Further, the second sliding block 124 is coupled with the fixed blocks 100 and 101 through guide shafts 128 and 129 and a ball screw 130. The rotation of the ball screw 130 due to the motor 102 which is fixed on the fixed block 100 guides the second sliding block 124 in such a manner that the nut attaching mechanism 111 can be moved to X direction.

Now, the construction and the operation of the bolt position detector 105 will be explained in more detail in connection with FIGS. 2 and 3. With respect to FIG. 2, in which the detecting fingers 106 and 107 for X and Z directions are fixed on the movable shaft 108 which is supported by a bearing 201. A detecting lever 202 is fixed on the movable shaft 108 and converts the rotating angle of the movable shaft 108 into displacement of Z direction. The detecting elements 109 and 110, which may be microswitches, detect small displacement values of the detecting lever 202 occurring from the detecting fingers 106 and 107, contacting to a bolt on which the nut should be screwed. In order to screw the nut on the bolt, it is necessary that the center axis of the nut is approximately positioned to that of the bolt, that is, the round-cornered portion of the nut is positioned to that of the bolt. For this purpose, the bolt position detector 105 is used.

Figure 3A:
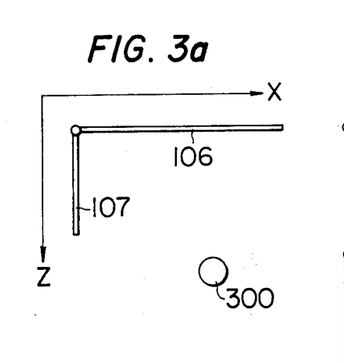
FIGS. 3a to 3d are diagrams showing a relative position between the bolt and the bolt position detector in order to describe the operation of the bolt position detector.
Figure 3B:
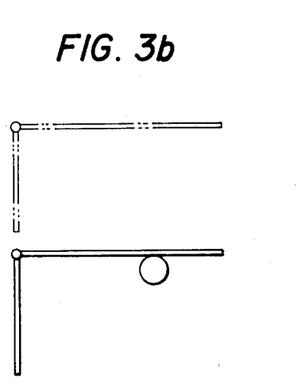
Figure 3C:
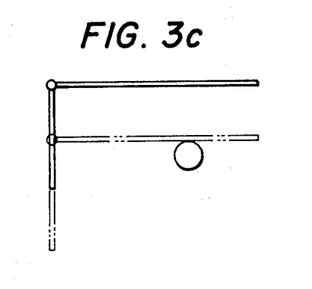
Figure 3D:
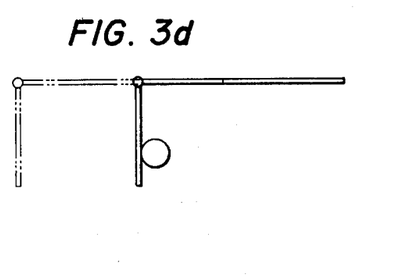

First of all, assuming that the bolt 300 is held by a bolt holder (not indicated), the positioning mechanism is so moved in the Y direction by the motor 103 that the bolt is placed within a rectangular space defined by the detecting fingers 106 and 107 of the bolt position detector 105 since the rough position of the bolt 300 is prememorized in a programmed memory device which will be explained below. The relative position between the bolt position detector 105 and the bolt is shown in FIG. 3a. Next, the positioning mechanism is moved in the Z direction by the motor 104 until the detecting element 109 detects that the detecting finger 106 has contacted the bolt 300 as shown in FIG. 3b, and then stoped by the detecting signal which is generated by the dectecting element 109. The position of the positioning mechanism in Z direction, at same time, is stored in a working memory device which will be explained below. The positioning mechanism thereafter, is moved back in the Z direction by a certain distance as shown in FIG. 3c. The positioning mechanism in a next step, the Z position of which is maintained, is moved in the X direction by the motor 102 until the detecting element 110 detects that the detecting finger 107 had contacted the bolt 300 as shown in FIG. 3d and then stoped by the detecting signal which is generated by the detecting element 110. The position of the positioning mechanism in X direction, at same time, is stored in the working memory device. The positioning mechanism, thereafter is moved back in the X direction by a certain distance. Although the distances moved back in the X and Z directions depend on several factors which relate to each length of the detecting fingers 106 and 107 and the size of the bolt, etc., they are selected experimentally. As a result, the X and Z co-ordinates of the center axis of the bolt 300 are stored in the working memory device since they can be calculated from the position of the positioning mechanism detected as have described above and the size of the bolt 300 which is given previously. The relative relationship between the bolt position detector 105 and the nut attaching mechanism 111 is given since the bolt position detector 105 is fixed on the housing 117 thereof. The bolt position detector 105, however, may not be fixed on the housing 117 thereof, if the relative relationship between the bolt position detector 105 and the nut attaching mechanism 111 are maintained, that is, they may be controlled independently. X and Z co-ordinates of the center axis of the nut can be calculated from the position of the positioning mechanism and the size of the nut which is given previously. As a result, the nut attaching mechanism 111 is so moved that the center axis of the nut 116 is placed in registration with that of the bolt and then the nut is pressed against the bolt 300 by the shift of the nut attaching mechanism 111 in the Y direction. Although the center axis of the nut in the above embodiment is placed in coincidence with that of the bolt after the detecting fingers 106 and 107 have been moved back by a certain distance, that is, two steps are taken to position the nut to the bolt, the nut attaching mechanism 111 may be so moved back directly that the center axis of the nut is placed in registration with that of the bolt after the detecting fingers 106 and 107 have contacted the bolt 300.

Next, the construction and the operation of the nut attaching mechanism 111 will be explained in more detail referring to FIGS. 4 and 5, in which elements indicated by numerals 112, 113, 114, 115 and 116 correspond to those shown in FIG. 1. A bar 401 fixed on the housing 117 supports the nut holder 115 through a spring 402. The first elastic mechanism 113 comprises a turning torque transmission shaft 403, a movable shaft 404, a housing 405 and a spring 406. The turning torque transmission shaft 403 is so coupled with the movable shaft 404 that the shaft 403 can be movable in an axial direction and is locked in a rotating direction with respect to the movable shaft 404. This coupling structure, for example, may be a square shape in a sectional view of a coupling portion as shown in FIG. 5. The shaft 403 is coupled with the rotary shaft 407 through the spring 406 by which it can be slid in the axial direction. The movable shaft 404 is coupled with the housing 405 through bearings 408 so that it can be movable in the rotating direction. On the other hand, the movable shaft 404 is connected to the housing 405, which is connected to the rotary shaft 407, through springs 501 and 502. As a result, The rotation of the motor 112 is transmitted to the turning torque transmission shaft 403 through the housing 405, springs 501 and 502, and the movable shaft 404. A displacement detector comprises a lever 409, which is fixed on the turning torque transmisson shaft 403, and a detecting element 410 such as a micro-switch, by which the displacement in the Y direction is detected. An angle displacement detector comprises a lever 411, which is fixed on the movable shaft 404, and a detecting element 412 such as micro-switch, by which the angle displacement between the turning torque transmission shaft 403 and the rotary shaft 407 is detected. Namely, the detecting element 410 detects a pressure which the nut 116 is pressed against the bolt 300 and the detecting element 412 detects a torque transmitted to the turning torque transmission shaft 403 when the nut is screwed on the bolt. Slip rings 413 and 414 are terminals for outputs signals of the detecting element 410 and slip rings 415 and 414 are terminals for output signals of the detecting element 412 wherein the slip ring 414 is a common ground terminal and electrodes contacting each slip ring are omitted.

Figure 4:
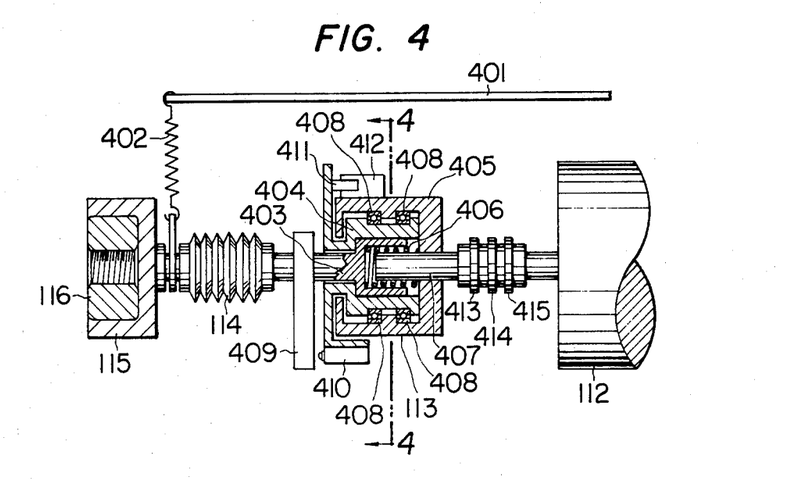
FIG. 4 is an enlarged sectional plan view of a nut attaching mechanism shown in FIG. 1.
Figure 5:
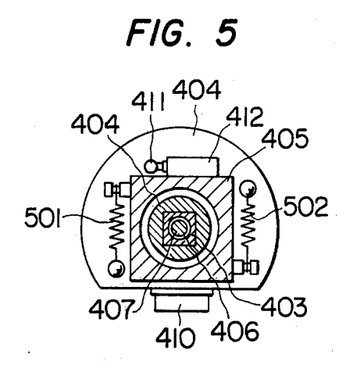
FIG. 5 is a sectional plane view taken along line 4—4 in FIG. 4.
Figure 6A:
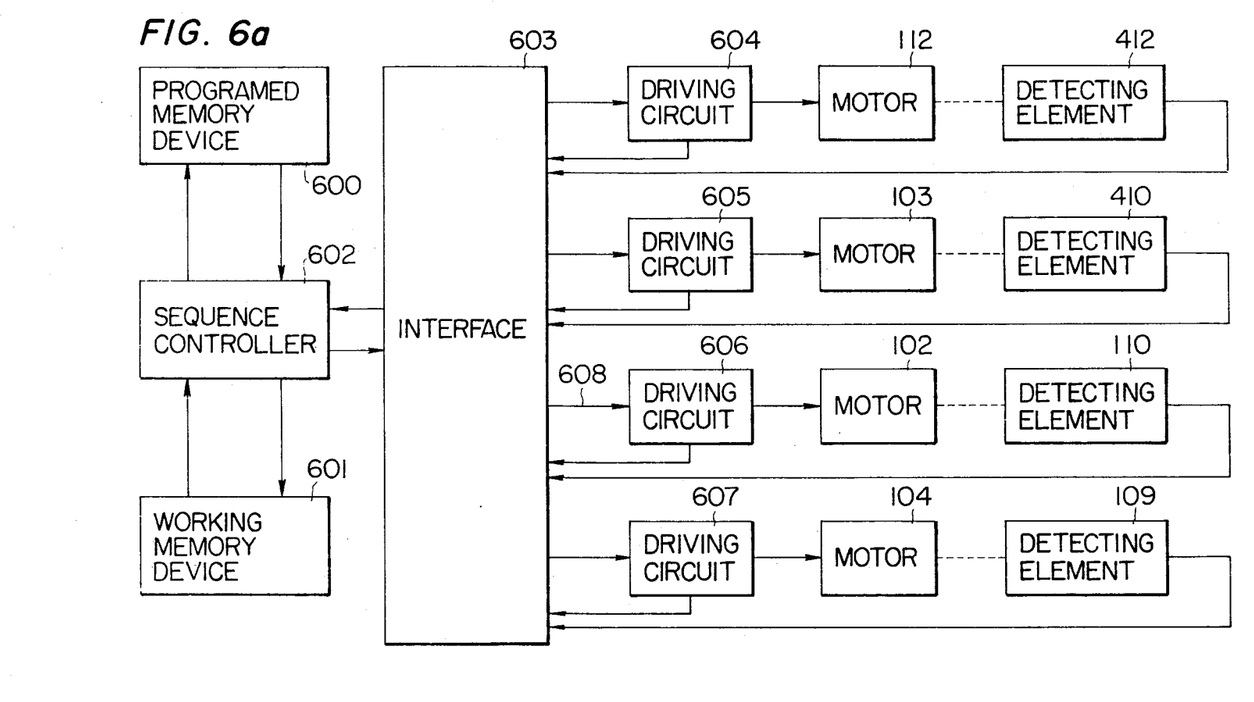
FIGS. 6a and 6b are schematic block diagrams of a control system used in this invention.

FIG. 6a shows a block diagram of a control system to control the positioning mechanism, in which the motors 102, 103, 104 and 112, and the detecting elements 109, 110, 410 and 412 correspond to those shown in FIGS. 1 and 4. A programmed memory device 600 stores control informations, which should be given previously, in order to control the motors 102, 103, 104 and 112, wherein the memory device 600 may be read only memory (ROM). A working memory device 601 is a read-write memory such as a random access memory (RAM) which stores the rotating portion informations from a screw motor driving circuit 604 and the position informations on the X, Y and Z co-ordinates from X, Y and Z motor driving circuits 102, 103 and 104. A sequence controller 602 operates to conrol the motor driving circuits 604, 605, 606 and 607 through an interface 603 such as a buffer register. The constructions and the operations of the programmed memory device 600, the work memory device 601 the sequence controller 602 and the interface 603 are well known in the catalog to Application Guide of the Micro-Controller published in Dec. 1969 by Scientific Micro System, Inc., for instance.

Figure 6B:
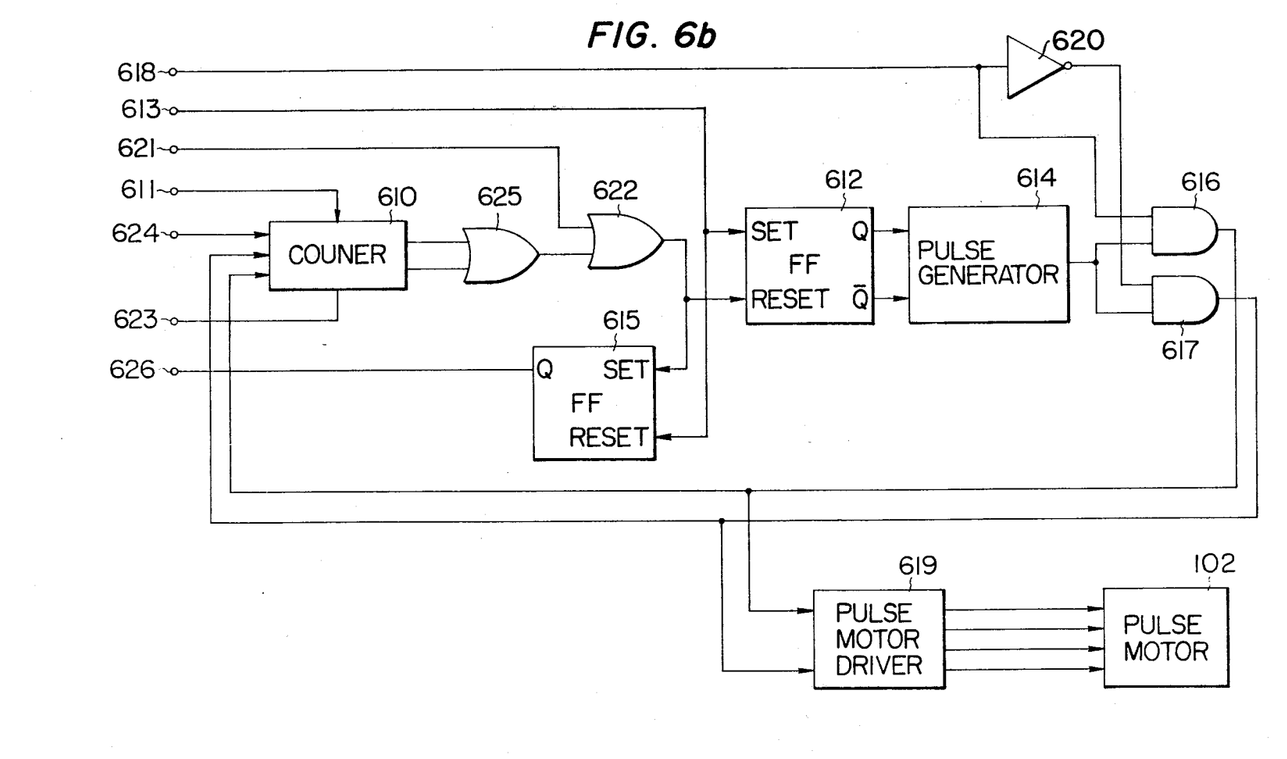

The operation of this control system will be explained with respect to the positioning in the X position of the positioning mechanism, wherein the positioning with respect to the Y and Z positions and the control of the rotating angle will be omitted from description since their operations are substantially same. The sequence controller 602 supplies data from the programmed memory device 600 to the driving circuit 606, which is shown in FIG. 6b in more detail, through the interface 603 and lines 608, wherein the data is of a distance which the positioning mechanism should be moved from the actual position thereof until the detecting finger 107 has contacted the bolt. A counter 610 in the driving circuit 606 is set due to the data applied from a data terminal 611 which is coupled with the interface 603, and at same time, the sequence controller 602 supplies pulses to a set terminal of a flip-flop 612 through a terminal 613 coupled with the interface 603 in order to actuate a pulse generator 614, as well as a flip-flop, and to a switching gate 616 or 617 through a terminal 618 coupled with the interface 603. The pulse from the terminal 618 is supplied to the switching gate 616 when the positive data is supplied to the counter 610, so that the output of the pulse generator 614 is supplied to a forward terminal of a pulse motor driver 619 through the switching gate 616. The pulse from the terminal 618 is supplied to the switching gate 617 through a inverter circuit 620 when the negative data is supplied to the counter 610, so that the output of the pulse generator 614 is supplied to a reverse terminal of a pulse motor driver 619 through the switching gate 617. Accordingly, the positioning mechanism moves in a positive direction on the X co-ordinate when the positive data is applied, and it moves in a negative direction thereon when the negative data is applied, where the motor 102 coupled with the pulse motor driver 619 is a reversible type. On the other hand, the output of the switching gate 616 or 617 is applied to the up terminal or the down terminal of the counter 610, the contents of which are rewritten in such a manner that the data as to the distance of the X direction are decreased whenever each pulse signal of the pulse generator 614 is generated thereby. Now, the detecting element 110 generates a signal which is applied to the sequence controller 602 through the interface 603 when the detecting finger 107 has contacted the bolt in the middle of the movement of the positioning mechanism. Then the sequence controller 602 supplys a stop signal to the reset terminal of the flip-flop 612 through a terminal 621 and a OR gate 622, whereby the nut attaching mechanism 111, stops moving in to the X direction, and at same time the contents of the counter 610 at that time are read out through a terminal 623 coupled with the interface 603 and stored in the working memory device 601, which correspond to the X position on the X co-ordinate. Then, the counter 612 is reset by a reset signal supplied on a reset terminal 624 which is coupled with the interface 603 in order to perform a next necessary step.

In a case that, however, the detecting element 110 does not generate the signal until the contents of the counter 610 becomes a zero, a carry output or a borrow output of the counter 610 is applied to the reset terminal of the flip-flop 612 through OR gates 625 and 622, so that the operation of the pulse generator 614 is stopped. At same time, the flip-flop 615 is set, the end signal from which is applied to the sequence controller 602 through a terminal 626. Accordingly, the sequence controller 602 sets the data for the shift of the nut attaching mechanism 111 from the programmed memory device 600 to the counter 610 and the operation as has been described above is repeated until the detecting finger 107 has contacted the bolt.

Then, the sequence controller 602 supplys data from the programmed memory device 600 to the counter 608, wherein the data is of the distance which the nut attaching mechanism 111 should be moved back. The operation of the positioning mechanism for this purpose will be omitted from explanation since it is substantially equal to that having been described above.

As have been understood in the above description, the center axis of the nut can be approximately positioned to that of the bolt.

The nut attaching mechanism 111 is moved to the Y direction until the nut is pressed against the bolt after the positioning between the center axis of the bolt and the nut have been achieved. The detecting element 410 detects that the nut have been pressed against the bolt with a predetermined pressure which is given previously by the spring 406. The sequence controller 602 supplis signals to the driving circuit 605 in order to stop the motor 103, and at same time the contents of the counter in the driving circuit 605, that is, the Y position on the Y co-ordinate are stored as the $Y_0$ in the working memory device 601.

Figure 7:
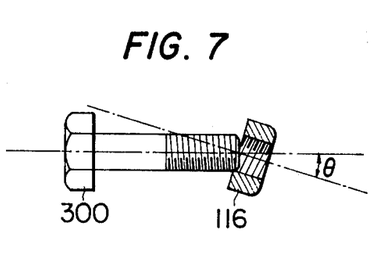
FIG. 7 is a diagram showing a relative relationship between a bolt and a nut.

Next, the operation for screwing the nut on the bolt will be explained. It is necessary that the relative angle $\theta$ shown in FIG. 7 between the center axes of the bolt and the nut is smaller than a certain angle $\theta_0$ in order that the nut can be screwed on the bolt. The relative angle $\theta$, however is not always smaller than the certain angle $\theta_0$ when the nut has been pressed against the bolt. The certain angle $\theta_0$ depends on the sizes of the bolt and the nut, pitches thereof and contact condition therebetween, etc. When the relative angle $\theta$ is larger than the certain angle $\theta_0$, the nut is irregularly locked to the bolt or slips at the top thereof.

In the case that the nut is irregularly locked to the bolt, the turning torque transmission shaft 403 and the movable shaft 404 are locked to rotate so that the relative position between the movable shaft 404 and the housing 405 is shifted, whereby the lever 411 is detached from the detecting element 412, thr signal of which is applied to the sequence controller 602 through the interface 603, assuming that the lever 411 is attached to the detecting element 412 by the springs 501 and 502 initially as shown in FIG. 5. The displacement value between the movable shaft 404 and the housing 405 depends on the strength of the springs 501 and 502 which is selected experimentally. Then, the sequence controller 602 supplies signals to the driving circuit 604 in order to stop the motor 112 and to reverse the rotation thereto, whereby the lock is canceled. Thereafter, next necessary steps, which will be explained below, are performed.

The slip of the nut is detected as folllows. If the relative angle $\theta$ is smaller than the certain angle $\theta_0$, the nut is screwed on the bolt by the rotation of the motor 112 since the nut is pressed against the bolt with the predetermined pressure so that the turning torque transmission shaft 403 is shifted in the Y direction, whereby the output of the detecting element 410 becomes a zero. According to the detection of the zero output of the detecting element 410, the sequence controller 602 actuates the motor 103 and makes the nut attaching mechanism move in the Y direction until the detecting element 410 is actuated, and then the operations as have been described previously are repeated until the nut is fastened to the bolt. The positioning mechanism finishes the assembling process for the bolt and the nut when the shifted distance thereof from the $Y_0$ has become larger than the predetermined value which is stored in the programmed memory device 600 due to the length of the bolt.

The slip of the nut, however, can be detected in the fact that the detecting element 410 does not indicate the zero output in a predetermined period of time. Therefore, the sequence controller 602 stops the rotation of the motor 112 and the next necessary steps are performed as will be expalined below. The predetermined period of time can be defined by the number N of the revolution of the motor 112, which is the number greater than the total revolution number from initiation of the rotation until the output of the detecting element 410 becomes the zero or equal thereto, and is shown by the following formula.

$$N \geq \frac{DSY}{P} + 1 \quad (1)$$

where P is pitches of a screw and DSY is an amount of hysteresis of the detecting element 412.

Figure 8:
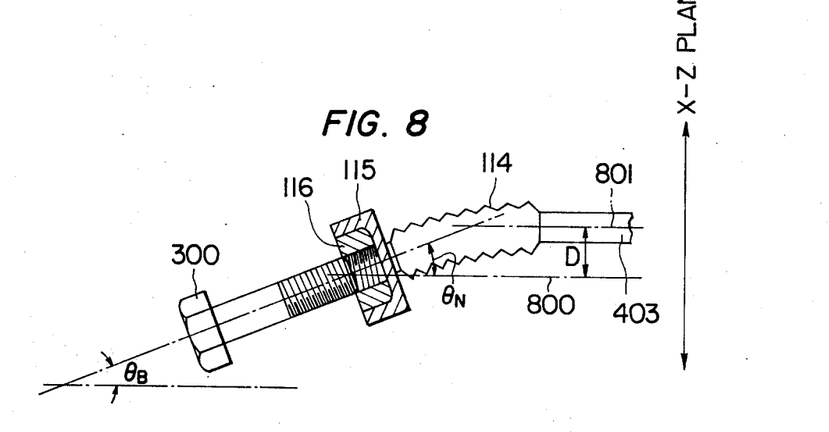
FIGS. 8 and 9 are diagrams for explaining an operation of a nut attaching mechanism of this invention.
Figure 9:
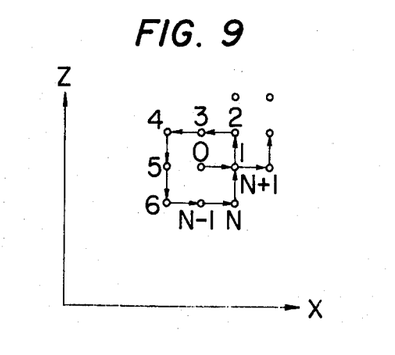

In the case that the lock or the slip of the nut is detected as have been explained above, the following steps are performed in order to search such the position that the relative angle $\theta$ becomes smaller than the certain angle $\theta_0$. Referring now to FIG. 8 in which an angle $\theta_B$ is an angle between the Y co-ordinate axis and the center axis of the bolt, an angle $\theta_N$ is an angle between the Y co-ordinate axis and the center axis of the nut, and D designates a distance between the center axis 800 of the turning torque transmission shaft 403 at the position of the nut attaching mechanism 111 where the nut 115 has been pressed against the bolt 300 and the center axis 801 thereof at the position of the nut attaching mechanism 111 where the nut 115 will be screwed on the bolt 300. The nut attaching mechanism 111 with the second elastic mechanism 114 is moved in the X-Z plane in the order of 0→1→2→-----, for instance, as shown in FIG. 9, wherein the operations as have been described previously are repeated at the each position. Accordingly, the angle $\theta_N$ is controlled by the movement of the nut attaching mechanism 111 and the inclination of the second elastic mechanism 114. Namely, the relative angle $\theta$ can satisfy the following formula (2) due to the shifted nut attaching mechanism.

$$\theta = \theta_B - \theta_N \leq \theta_0 \quad (2)$$

where $\theta_N$ is shown as a function of D.

$$\theta_N = f(D) \quad (3)$$

The formula (3) is changed to a formula (4)

$$D = g(\theta_N) \quad (4)$$

A condition to screw the nut on the bolt is shown due to following formulas.

$$-\theta_0 \leq \theta_B - \theta_N \leq \theta_O \quad (5)$$

$$-\theta_0 \leq \theta_B - f(D) \leq \theta_0 \theta_B - \theta_0 \leq f(D) \leq \theta_B + \theta_0 \quad (6)$$

Accordingly, the angle $\theta_N$ being able to satisfy the formula (6) is found out by the control of D in response to the angle $\theta_B$, in order to screw the nut on the bolt. According to this method, the nut can be screwed on the bolt due to the change of D without a measurement of the angle $\theta_B$.

In the above embodiment, the searching steps are programmed previously such as the searching pattern shown in FIG. 9. According to this method, the positioning mechanism takes the same searching steps in spite of the inclination angle of the bolt. Therefore, the necessary operations of the positioning mechanism, in order to screw the nut on the bolt, are repeated at each position in the order of 0→1→2→ - - - - - as shown in FIG. 9, even if the nut is screwed on the bolt at the position 6 in FIG. 9. Such operations are useless and not practical. It is, however, possible to shift the positioning mechanism directly from the position 0 to the position 5 if the direction of the inclination of the bolt can be detected.

Figures 10, 11:
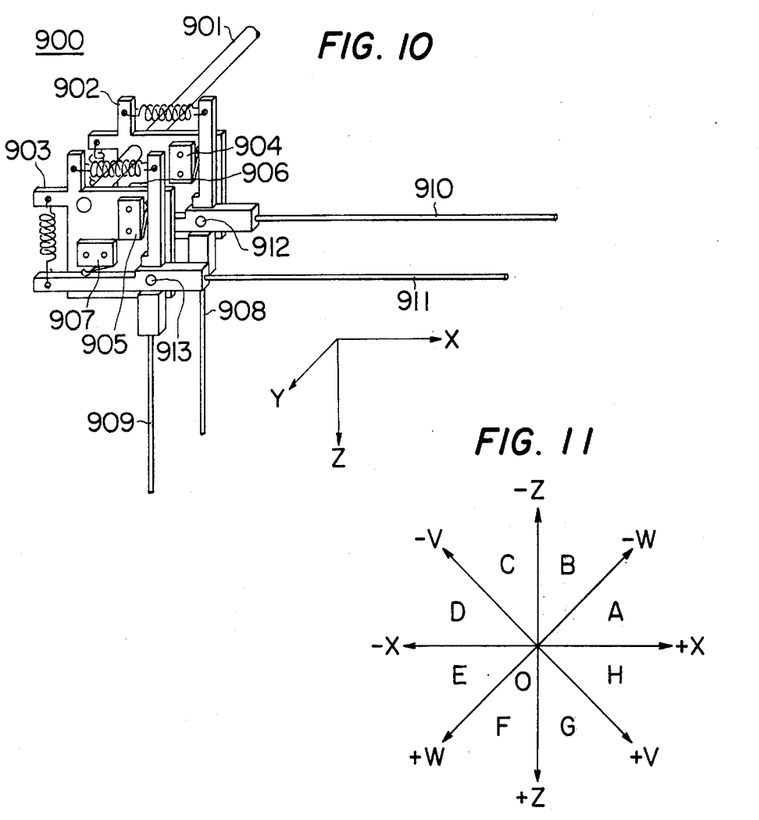
FIG. 10 is a perspective view of a modified bolt position detector used for this invention.
FIG. 11 is a diagram for explaining an inclination angle of a bolt.

FIG. 10 shows a bolt position detector 900 to detect the inclination direction of the bolt approximately. The bolt position detector 900 can be used instead of the bolt position detector 105 shown in FIG. 1. A supporting shaft 901, on which supporting plates 902 and 903 are fixed, is fixed on the housing 117 shown in FIG. 1, for instance. Detecting elements 904 and 905 for the X direction and detecting elements 906 and 907 for the Z direction are placed on the supporting plates 902 and 903, respectively. Detecting fingers 908 and 909 for the X direction, and detecting fingers 910 and 911 for the Z direction are movably supported by shafts 912 and 913 on the supporting plates 902 and 903. The explanation as to each operation of the detecting elements 904, 905, 906 and 907 respectively coupled with the detecting fingers 908, 909, 910 and 911, is omitted since each operation thereof is nearly equivalent to that of the each detecting element shown in FIG. 2.

Now, the operation of the bolt position detector 900 will be explained. The positioning mechanism is shifted in the Z direction until the detecting element 906 coupled with the detecting finger 910 indicates the output signal thereof, and then stoped by the output signal. In the above step, the following facts are illuminated. Namely, the bolt is inclined to the positive direction with respect to the Z co-ordinate axis when the output of the detecting element 907 appears before the output of the detecting element 906 will appear. When the outputs of both detecting elements 906 and 907 appear at the same time, the bolt is placed in parallel with the X-Y plane. However, when the output of the detecting element 907 does not appear before the output of the detecting element 906 appear, the bolt inclines in the negative direction with respect to the Z co-ordinate axis. Further, the inclination angle between the bolt and the X-Y plane can be calculated in the case where the outputs of the detecting elements 906 and 907 appear since the shifted distance of the nut attaching mechanism 111 is detected and the distance between the detecting fingers 910 and 911 is given. Next, the positioning mechanism is moved back in the Z direction by the certain distance as described previously, and then the operation of the positioning mechanism for the X direction is performed as well as. In this step, the status of the bolt with respect to the X co-ordinate axis is detected due to the principle as have been explained above. Last of all, the nut is positioned to the bolt by the nut attaching mechanism and the steps to screw the nut on the bolt are performed, wherein the informations relating to the position and the inclination, etc. of the bolt are stored in the working memory device 601 shown in FIG. 6a.

Figure 12A:
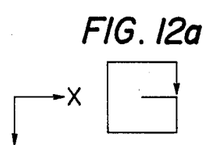
Figure 12B:
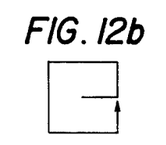
Figure 12C:
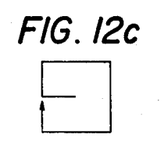
Figure 12D:
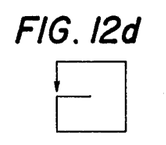
Figure 12E:
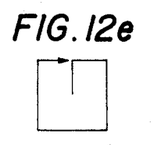
Figure 12F:
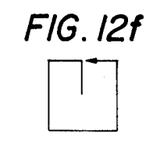
Figure 12G:
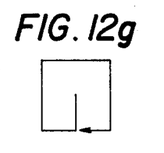
Figure 12H:
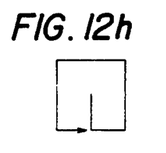

Now, the searching pattern is changed by these informations when the lock or the slip of the nut has been detected. The searching steps will be explained in more detail in connection with FIGS. 11 and 12. Assuming that the center axis of the bolt passes the original point O of the X and Z co-cordinates shown in FIG. 11, the following steps will be described. The nut attaching mechanism 111 is shifted on the X-Z plane due to the searching pattern (a) shown in FIG. 12, which is stored in the programmed memory device 600 previously when the center axis of the bolt inclines approximately to the +X or +V direction shown in FIG. 11. When the center axis of the bolt inclines to the −W direction, the searching pattern (b) is used to shift the nut attaching mechanism 111. When the center axis of the bolt inclines to the −X or −V direction, the searching pattern (c) is used, for instance. As have been understood by the above description, one of the searching patterns shown in FIG. 12, which depends on the inclination of the bolt, is utilized. By selecting the searching pattern, the unnecessary searching of the positioning mechanism are omitted, so that a period of time for the assembling processes can be shortened so much.

In the above embodiment, if the nut attaching mechanism 111 is moved until the both detecting fingers 910 and 911 for the Z direction and the both detecting fingers 908 and 909 are positively contacted to the bolt, the inclination angle of the bolt can be calculated by the sequence controller 602 due to the outputs of the detecting elements 904, 905, 906 and 907. The informations relating to the inclination angle may be used to change the area where the nut attaching mechanism 111 should be shifted, wherein the area is defined by the size of the searching pattern shown in FIG. 12.

Figure 13:
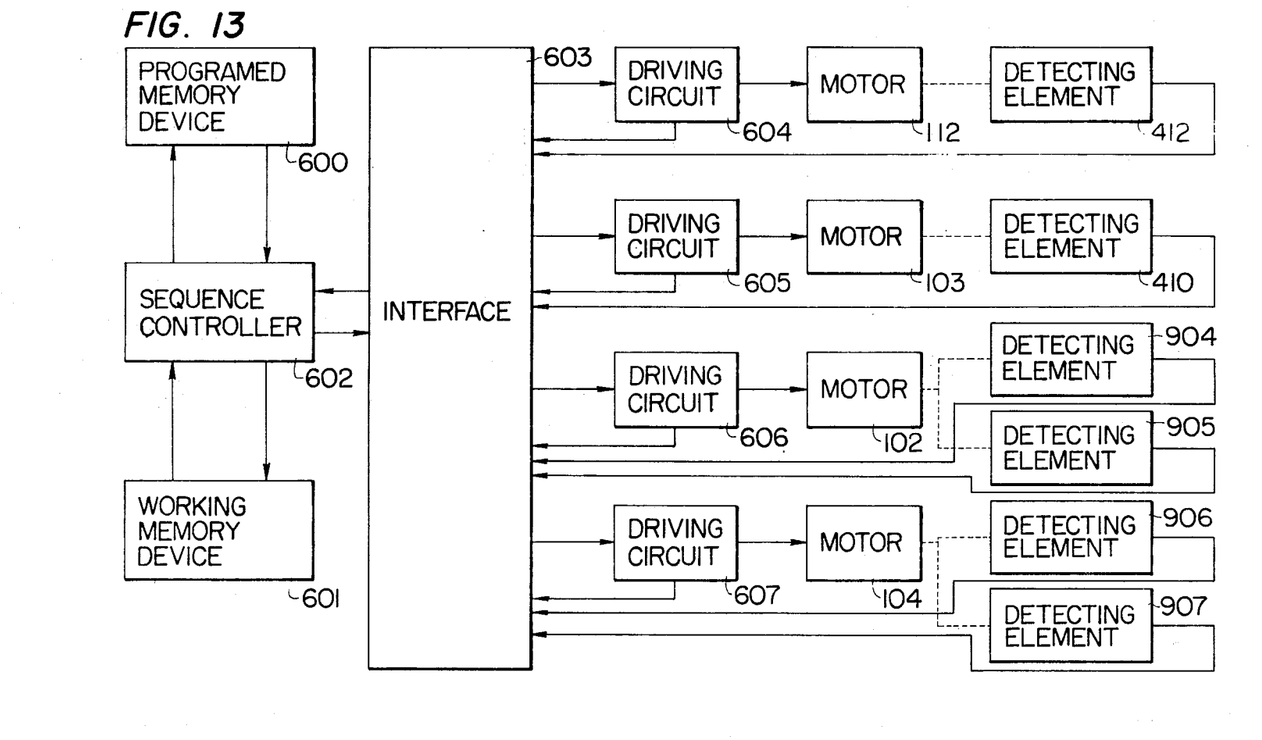
FIG. 13 is a schematic block diagram of a modified control system for the modified bolt position detector shown in FIG. 10.

FIG. 13 is a diagram showing a control system for the positioning mechanism with the bolt position detector 900 shown in FIG. 10, in which the refference numerals correspond to those shown in FIGS. 6a and 10. The operation of this control system is nearly equivalent to that of the control system shown in FIG. 6a, in addition, the output signals of the detecting elements 904, 905, 906 and 907 are supplied to the sequence controller 602 through the interface 603. Accordingly, the sequence controller 602 calculates the inclination angle of the bolt according to these output signals and elects the necessary searching pattern from the programmed memory device 600, whereby the positioning mechanism is controlled to screw the nut on the bolt.

Figure 14:
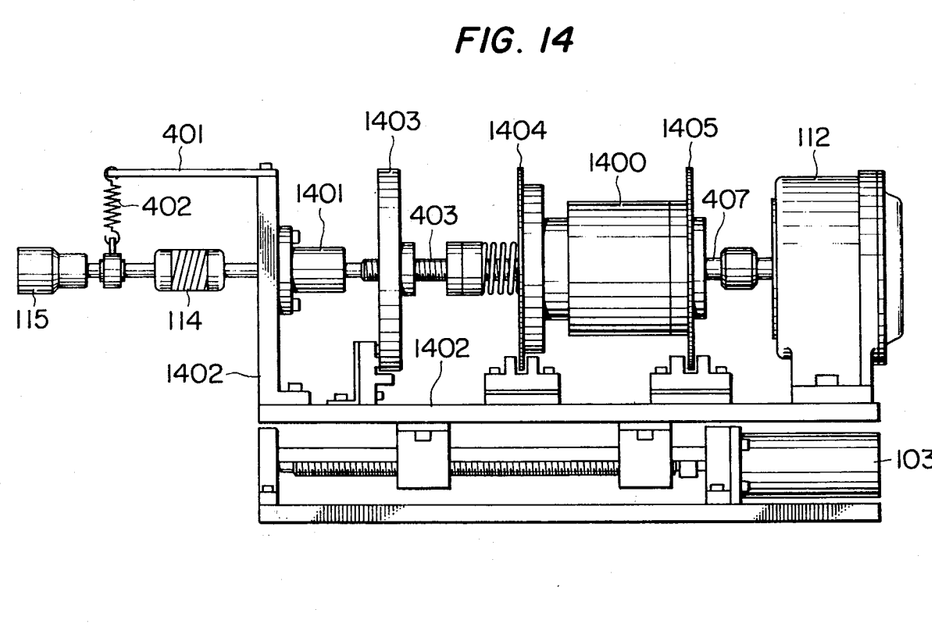
FIG. 14 is a schematic diagram of a modified embodiment of this invention.
Figure 15:
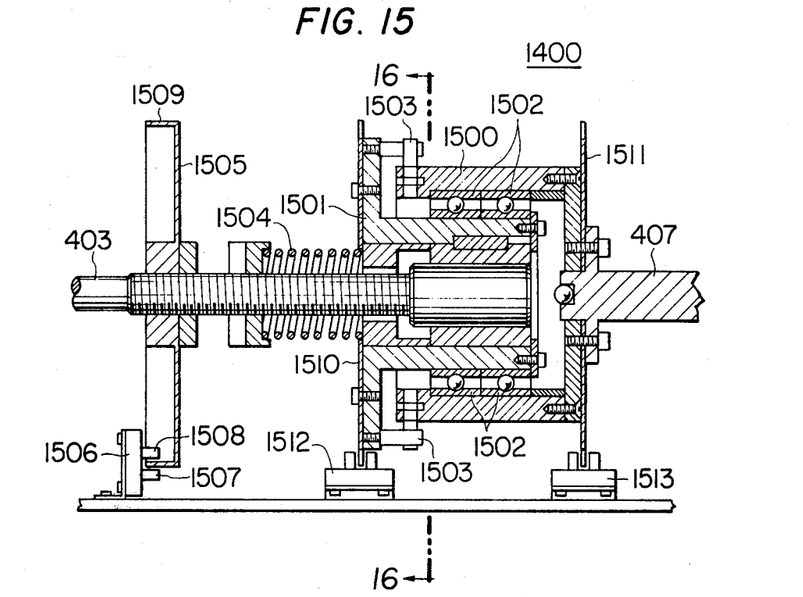
FIG. 15 is an enlarged diagram of a portion of the modified embodiment shown in FIG. 14.

In the above description, the embodiments in which the positioning mechanism detects the position or the inclination angle of the bolt have been explained. If, however, the bolt is so set that the bolt is placed at right angles with respect to the X-Z plane, and at the predetermined position on the center axis of the nut holder 115, the shifts of the positioning mechanism to the X and Z direction are not needed. Therefore, the construction of the positioning mechanism and the control system thereof become very simple. Referring to FIG. 14, in which the reference numerals correspond to those of FIGS. 1 and 4. A reference numeral 1400 designates a first elastic mechanism, the operation of which is similar that of the first elastic mechanism 113 shown in FIG. 4. The construction of the first elastic mechanism 1400 which is shown in more detail in FIG. 15, is slightly different from that of the first elastic mechanism 113. The nut holder 115 may be so designed as to give the nut more play in the nut holder 115, so that the nut can be flexible in the nut holder 115. As a result, it becoms very easy to screw the nut on the bolt since the margin for screwing the nut on the bolt is enlarged. The nut holder 115 is connected to the turning torque transmission shaft 403 through the second elastic mechanism 114. The transmission shaft 403 is supported by a bearing 1401 which is placed on a supporting body 1402. A reference numerals 1403 designates a non-contact detector for detecting the displacement to the Y direction. Reference numerals 1404 and 1405 designate a non-contact detector for detecting the displacement angle between the transmission shaft 403 and the rotary shaft 407. Although the outputs of the detecting elements 410 and 412 shown in FIG. 4 are detected through the slip rings 413, 414 and 415 of the contact type, the detectors of the non-contact type are utilized in FIG. 14. The description of the operation of the positioning mechanism shown in FIG. 14 is omitted since the controlling methods of shifting to the Y direction and of screwing the nut on the bolt are nearly equivalent to those of the positioning mechanism shown in FIG. 1. The first elastic mechanism comprises a housing 1500 fixed on the rotary shaft 407, a movable shaft 1501 movably coupled with the housing 1500 through bearings 1502 and connected to the housing 1500 through springs 1503 and a spring 1504 connecting between the turning torque transmission shaft 403 and the movable shaft 1501. The transmission shaft 403 can be moved in the axial direction thereof due to the spring 1504. The movable shaft 1501 can be movable in the rotating direction. Therefore, the function of the first elastic mechanism 1400 is as same as that of the first elastic mechanism 113 shown in FIG. 4.

Figure 16:
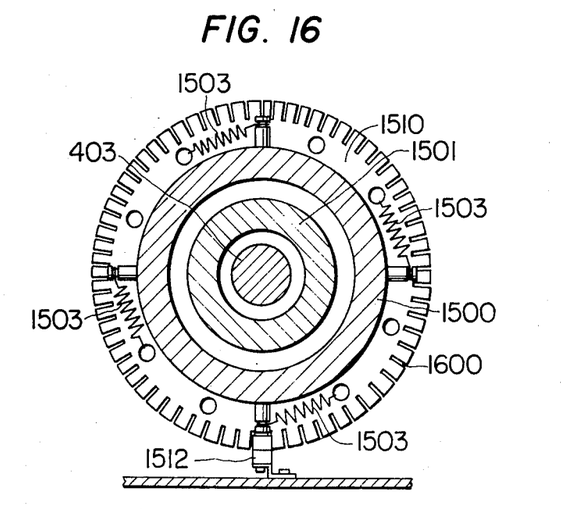
FIG. 16 is a sectional plane view taken along line 16-16 in FIG. 15.

The non-contact detector 1403 comprises a round plate 1505 fixed on the transmission shaft 403 and a detecting element 1506. The detecting element 1506 provides a light emitting element 1507 such as a photo-diode and a light receiving element 1508 such as a photo-transistor. The round plate 1505 has a portion 1509 which intercepts the light passage between the light emitting element 1507 and the light receiving element 1508. According to this construction, the non contact detector 1403 can detect the displacement in the Y direction by detecting the presence or the absence of the portion 1509 in the light passage. The non-contact detector for the displacement angle comprises round plates 1510 and 1511, one of which is fixed on the movable shaft 1501 and the other one is fixed on the housing 1500, and detecting elements 1512 and 1513. The detecting elements 1512 and 1513 have the same construction as that of the detecting element 1506. The round plates 1510 and 1511 have a plurality of slits 1600 in the periphery thereof as shown in FIG. 16. Accordingly, the detecting elements 1512 and 1513 generate pulse signals due to the rotation of the each round plate with a plurality of the slits 1600. As a result, the displacement angle between the two round plates is detected by the comparison between the outputs of the detecting elements 1512 and 1513, for instance, the difference of the number of the pulses.

In the above in which the bolt is inclined, the nut may be locked on the bolt before the nut will be fastened to the bolt since the second elastic mechanism 114 inclines due to the shift of the nut attaching mechanism 111. In this case, the position of the nut attaching mechanism 111 may be changed as shown in FIG. 9 in order to screw the nut on the bolt.

Although the above embodiments are the cases where the nut is screwed on the bolt, these techniques are applicable to the assembling process and apparatus screwing the bolt in the nut, etc.

While only a few forms of this invention have been shown and described, many modifications will be apparent to those skilled in the art within the spirit and scope of the invention as set forth in the appended claims.

We claim:

1. An automatic assembling apparatus comprising:
   first means for holding a first object, which is screwed on a second object supported by a holder;
   second means coupled with said first means, said second means being movable in an axial direction and in a rotating direction with respect to a center axis of said second means, and said second means being capable of inclination with respect to the center axis thereof;
   third means for detecting the displacement of said second means;
   fourth means for driving said first means to screw said first object on said second object; and
   fifth means for controlling said fourth means, said fifth means receiving signals from said third means;
   wherein sixth means are included for detecting a position of said second object and seventh means are included for moving said first means within a plane at right angles with respect to the center axis of said first means, said seventh means being controlled by said fifth means, to which signals from said sixth means are supplied.

2. An automatic assembling apparatus according to claim 1, wherein said second means comprises a first elastic mechanism and a second elastic mechanism, said first elastic mechanism being movable in an axial direction and in a rotating direction with respect to the center axis thereof, said second elastic mechanism being capable of inclination with respect to the center axis thereof, said third means comprising two detecting elements which detect displacements with respect to said axial direction and said rotating direction, respectively, and said fourth means comprises a screw motor and a driving motor, said screw motor coupled with said first means through said second means, by which said first means is rotated, said driving motor pressing said first object against said second object.

3. An automatic assembling apparatus according to claim 2, wherein said sixth means comprises two detecting fingers arranged at right angle and two detecting elements, each of which detects the displacement of said each detecting finger.

4. An automatic assembling apparatus according to claim 3, wherein said detecting elements are coupled with said fifth means through slip rings, respectively, each of which is placed on the shaft of said driving motor.

5. An automatic assembling apparatus according to claim 3, wherein said detecting elements are non-contact detectors coupled with said fifth means.

6. An automatic assembling apparatus according to claim 3, wherein said first means is so designed that said nut can be flexible therein.

7. An automatic assembling apparatus according to claim 1, wherein, said sixth means is commonly moved with said first means.

8. An automatic assembling apparatus according to claim 1, wherein said first and said second objects are a nut and a bolt, respectively.

9. An automatic assembling apparatus according to claim 2, wherein said second elastic mechanism accommodates inclinations by said first object with respect to the axis of rotation of said screw motor, such that said first object can be screwed onto said second object even during inclinations of said second object.

10. An automatic assembling apparatus comprising:
    first means for holding a first object, which is screwed on a second object supported by a holder;
    second means coupled with said first means, said second means being movable in an axial direction and in a rotating direction with respect to a center axis of said second means, and said second means being capable of inclination with respect to the center axis thereof;
    third means for detecting the displacement of said second means;
    fourth means for driving said first means to screw said first object on said second object;
    fifth means for controlling said fourth means, said fifth means receiving signals from said third means;
    sixth means for detecting a position of said second object; and seventh means for moving said first means within a plane at right angles with respect to the center axis of said first means, said seventh means being controlled by said fifth means, to which signals from said sixth means are supplied;

wherein said sixth means comprises two pairs of detecting fingers and two pairs of detecting elements, each pair of said detecting fingers comprising two detecting fingers, respectively which are arranged at right angle, and being spaced from each other, said each detecting finger in one pair of said detecting fingers placed in parallel with said each detecting finger in the other pair of said detecting fingers, said each detecting element coupled with said each detecting finger and detecting the displacement of said each detecting finger.

11. An automatic assembling apparatus according to claim 10, wherein said first and said second objects are a nut and a bolt, respectively, and said first means is so designed that said nut can be flexible therein.

12. An automatic assembling apparatus according to claim 10, wherein said sixth means is commonly moved with said first means.

13. An automatic assembling apparatus according to claim 12, wherein said detecting elements are coupled with said fifth means through slip rings, respectively, each of which is placed on the shaft of said driving motor.

14. An automatic assembling apparatus according to claim 12, wherein said detecting elements are non-contact detectors coupled with said fifth means.

15. An automatic assembling apparatus according to claim 10, wherein said second means comprises a first elastic mechanism and a second elastic mechanism, said first elastic mechanism being movable in an axial direction and in a rotating direction with respect to the center axis thereof, said second elastic mechanism being capable of inclination with respect to the center axis thereof, said third means comprising two detecting elements which detect displacements with respect to said axial direction and said rotating direction, respectively, and said fourth means comprises a screw motor and a driving motor, said screw motor coupled with said first means through said second means, by which said first means is rotated, said driving motor pressing said first object against said second object.

16. An automatic assembling apparatus according to claim 15, wherein said sixth means detects inclinations of said second object from the axis of rotation of said screw motor, said sixth means controlling said second means to change the angle of said inclinations to be within a predetermind angle $\theta$.

17. An automatic assembling apparatus according to claim 16, wherein said second elastic mechanism accommodates said inclinations by said first object with respect to said axis of rotation, such that said first object can be screwed onto said second object even during inclinations of said second object.

18. An automatic assembling apparatus comprising
first detecting means for detecting the position of a first object,
positioning means responsive to said first detecting means for positioning a second object with respect to said first object for fastening said second object to said first object, said positioning means roughly positioning said second object with respect to said first object in response to said first means,
driving means for pressing said second object against said first object,
motor means for rotating said second object to fasten said second object to said first object,
second detecting means for detecting the fastening of said second object to said first object, and
means responsive to said second detecting means in accordance with an irregular fastening for controlling said positioning means to readjust the position of said second object relative to said first object while maintaining said second object pressed against said first object by said driving means, controlling said means reactivating said motor means upon obtaining a predetermined readjustment of said position of said second object to again fasten said second object to said first object.

19. An automatic assembling apparatus according to claim 18, further comprising elastic means for elastically holding said second object from said positioning means, wherein said elastic means comprises a first elastic mechanism being flexible in an axial direction and in a rotating direction with respect to an axis of rotation of said motor means, and a second elastic mechanism being capable of inclination with respect to said axis of rotation.

20. An automatic assembling apparatus according to claim 19, wherein said second detecting means includes at least two detecting elements for detecting respective displacements of said first elastic mechanism in said axial direction and in said rotating direction.

21. An automatic assembling apparatus according to claim 20, wherein said first object is a bolt and said second object is a nut, said nut and bolt being screwed to one another during said fastening.

22. An automatic assembling apparatus according to claim 21, wherein said nut is flexibly held to accommodate play between said nut and said bolt.

23. An automatic assembling apparatus according to claim 20, wherein said detecting elements are coupled with said second detecting means through respective slip rings, each of which is placed on a shaft of said driving means.

24. An automatic assembling apparatus according to claim 20, wherein said detecting elements are non-contact detectors coupled with said second detecting means.

25. An automatic assembling apparatus according to claim 19, wherein said second elastic mechanism accommodates inclinations by said second object with respect to said axis of rotation, such that said second object can be screwed onto said first object even during inclinations of said first object.

26. An automatic assembling apparatus according to claim 25, wherein said positioning means moves said second object in a plane at right angles to said axis of rotation so as to accommodate said inclination of said first object within a predetermined angle $\theta$.

27. An automatic assembling apparatus according to claim 19, wherein said first detecting means comprises two detecting fingers arranged at right angles, and two detecting elements, each of which detects the displacement of said detecting finger.

28. An automatic assembling apparatus according to claim 19, wherein said first detecting means comprises two pairs of detecting fingers and two pairs of detecting elements, each pair of said detecting fingers comprising two detecting fingers, respectively, which are arranged at right angles, and being spaced from each other, each said detecting finger in one pair of said detecting fingers placed in parallel with each said detecting finger in the other pair of said detecting fingers, each said detecting element being coupled with each said detecting finger for detecting displacement of each said detecting finger.

* * * * *